United States Patent
Yadav et al.

(10) Patent No.: US 12,267,231 B2
(45) Date of Patent: Apr. 1, 2025

(54) DYNAMIC PATH COMPUTATION IN NETWORKS BASED ON AUTOMATICALLY DETECTED UNAVOIDABLE RISKS

(71) Applicant: Ciena Corporation, Hanover, MD (US)

(72) Inventors: Bhupendra Yadav, Ottawa (CA); Prabhu Vaithilingam, Kanata (CA); Gerald Smallegange, Stittsville (CA)

(73) Assignee: Ciena Corporation, Hanover, MD (US)

( * ) Notice: Subject to any disclaimer, the term of this patent is extended or adjusted under 35 U.S.C. 154(b) by 389 days.

(21) Appl. No.: 17/897,675

(22) Filed: Aug. 29, 2022

(65) Prior Publication Data

US 2024/0073125 A1    Feb. 29, 2024

(51) Int. Cl.
*H04L 45/28* (2022.01)
*H04L 45/036* (2022.01)

(52) U.S. Cl.
CPC ............ *H04L 45/28* (2013.01); *H04L 45/036* (2022.05)

(58) Field of Classification Search
CPC ....... H04L 45/28; H04L 45/036; H04L 45/22; H04L 45/12
See application file for complete search history.

(56) References Cited

U.S. PATENT DOCUMENTS

| | | | |
|---|---|---|---|
| 8,296,407 B2 | 10/2012 | Doshi et al. | |
| 8,456,984 B2 | 6/2013 | Ranganathan et al. | |
| 8,515,280 B1 | 8/2013 | Li et al. | |
| 8,824,334 B2 | 9/2014 | Vasseur et al. | |
| 8,854,955 B2 | 10/2014 | Prakash et al. | |
| 8,867,333 B2 | 10/2014 | Doshi et al. | |
| 9,167,318 B1 | 10/2015 | Connolly et al. | |
| 9,497,521 B2 | 11/2016 | Sareen et al. | |
| 2002/0191573 A1 | 12/2002 | Whitehill et al. | |
| 2003/0131130 A1 | 7/2003 | Malkosh | |
| 2005/0025058 A1* | 2/2005 | Chaudhuri | H04L 45/123 370/254 |
| 2006/0004916 A1 | 1/2006 | Caviglia et al. | |
| 2006/0140190 A1* | 6/2006 | Lee | H04L 45/04 370/395.3 |
| 2008/0130491 A1 | 6/2008 | Chao et al. | |

(Continued)

OTHER PUBLICATIONS

Wang et al., "Novel disjoint path selection scheme based on link availability in Ason", Journal of China Universities of Posts and Telecommunications, Beijing-Youdian-Daxue, CN, vol. 14, No. 3, Sep. 1, 2007 (Sep. 1, 2007) pp. 70-73, XP022938027, ISSN: 1005-8885(07)60151-4.

(Continued)

*Primary Examiner* — Jianye Wu
(74) *Attorney, Agent, or Firm* — Baratta Law PLLC; Lawrence A. Baratta, Jr.

(57) ABSTRACT

Systems and methods for dynamic path computation in networks based on automatically detected unavoidable risks include receiving a plurality of shared risks associated with any of one or more network layers, network links, and network equipment; automatically creating a local ignore list for a source node and a remote ignore list for a destination node, based on the plurality of shared risks; and utilizing the plurality of shared risks in a path computation for a path between the source node and the destination node and ignoring any of the plurality of shared risks in the local ignore list and the remote ignore list.

19 Claims, 7 Drawing Sheets

(56) References Cited

U.S. PATENT DOCUMENTS

| | | |
|---|---|---|
| 2008/0170857 A1 | 7/2008 | Bardalai et al. |
| 2010/0172236 A1 | 7/2010 | Madrahalli et al. |
| 2012/0075988 A1 | 3/2012 | Lu et al. |
| 2012/0307644 A1 | 12/2012 | Gandhi et al. |
| 2013/0003605 A1 | 1/2013 | Peterson |
| 2013/0010589 A1 | 1/2013 | Kini et al. |
| 2013/0223225 A1 | 8/2013 | Hui et al. |
| 2014/0147107 A1 | 5/2014 | Swinkels et al. |
| 2014/0126355 A1 | 8/2014 | Filsfils et al. |
| 2014/0226967 A1 | 8/2014 | Ahuja et al. |
| 2014/0258486 A1 | 9/2014 | Filsfils et al. |
| 2014/0355419 A1* | 12/2014 | Pillai ............... H04L 45/50 370/225 |
| 2015/0295673 A1 | 10/2015 | Zhang et al. |
| 2016/0112327 A1 | 4/2016 | Morris et al. |
| 2016/0164739 A1 | 6/2016 | Skalecki |
| 2017/0063658 A1 | 3/2017 | Ashwood-Smith et al. |
| 2018/0097725 A1 | 4/2018 | Wood et al. |
| 2018/0191635 A1 | 7/2018 | Karthikeyan et al. |
| 2018/0262421 A1 | 9/2018 | Skalecki et al. |
| 2021/0119903 A1 | 4/2021 | Skalecki et al. |
| 2022/0086078 A1* | 3/2022 | Sivabalan ............... H04L 45/34 |

OTHER PUBLICATIONS

Dec. 11, 2020, European Search Report and the Annex to the European Search Report on European Patent Application No. EP 20 20 3025.

Nov. 3, 2023, International Search Report and Written Opinion for International Application No. PCT/US2023/030834.

* cited by examiner

DYNAMIC PATH COMPUTATION IN NETWORKS BASED ON AUTOMATICALLY DETECTED UNAVOIDABLE RISKS

FIELD OF THE DISCLOSURE

The present disclosure relates generally to networking and computing. More particularly, the present disclosure relates to systems and methods for dynamic path computation in networks based on automatically detected unavoidable risks.

BACKGROUND OF THE DISCLOSURE

Shared Risk Group (SRG) is a concept in network routing that different connections may suffer from a common failure if they share a common risk or a common SRG. SRG can be used with optical networks, Ethernet networks, Multiprotocol Label Switching (MPLS) networks including the Generalized Multiprotocol Label Switching (GMPLS) networks, Internet Protocol (IP) networks, and the like as well as multi-layer networks. An SRG failure makes multiple connections go down because of the failure of a common resource those connections share. Examples of SRGs include Shared Risk Link Group (SRLG), Shared Risk Node Group (SRNG), Shared Risk Equipment Group (SREG), etc. An SRLG is a risk on a cable or the like, an SRNG is a risk associated with a node or network element, and an SREG is a risk that extends within the node or network element itself, e.g., down to a module or other type of equipment. The descriptions herein may reference SRLGs for illustration purposes, but those skilled in the art will recognize any, and all types of SRG risk representation are contemplated herein. SRLGs refer to situations where links in a network share a common fiber (or a common physical attribute such as fiber conduit or the like). If one link fails, other links in the group may fail too, i.e., links in the group have a shared risk which is represented by the SRLG. SRLGs are used in optical, Ethernet, MPLS, GMPLS, and/or IP networks and used for route computation for diversity.

In multi-layer networks, a link at an upper layer has a connection at a lower layer, and thus any network resources (links, nodes, line cards, and the like) used by the lower layer connection can be represented as SRLGs on the upper layer links. That is, MPLS tunnels, OTN connections, IP routes, etc. all operate on a lower layer optical network (Layer 0). For example, an MPLS link at an MPLS layer may have an SRLG to represent a connection at Layer 0 and thus any optical nodes, amplifiers, and multiplexing components, as well as fiber cables and conduits used by the Layer 0 connection, are accounted for in SRLGs on the MPLS link. As an example, one would not want to protect MPLS tunnels where the protected tunnels share a risk in an optical network. The SRLGs are used in the MPLS route computation to ensure the protected tunnels share no common risks in the optical network. That is, route or path computation can compare SRLGs of links between two paths to determine if they are disjoint or not. If two paths have a common risk, i.e., share an SRLG, there is a possibility of a common fault taking both paths down. Of course, this defeats the purpose of protection and is to be avoided.

For example, SRLG in MPLS Traffic Engineering (MPLS-TE) include associated links that share the same resources i.e., all links will fail if that resource fails. SRLG can be represented by a 32-bit number and is unique in the Interior Gateway Protocol (IGP) (e.g., Intermediate System-Intermediate System (ISIS) or Open Shortest Path First (OSPF)) domain. For a give Label Switched Path (LSP), its SRLGs are a union of all the resources used by this LSP from source to destination. When SRLGs are used, a backup path can be made completely diverse from the primary path by excluding all SRLGs used by the primary path from its calculation of the backup path. This makes sure that backup path is not affected by the failure of any resources used by the primary path.

Unavoidable SRLGs are ones which physically cannot be avoided. An example of such can be an optical risk at a source or destination node. There are existing approaches to deal with such unavoidable risks including, not using SRLG on contested resources, using loose SRLGs, i.e., some SRLGs are ignored from calculations, weighted SRLGs, and manually configured unavoidable SRLG, used on a case-by-case basis manually. Disadvantageously, all these existing approaches are configuration intensive, i.e., there is no automation or allowing the network to learn. Further, this creates intensive configuration changes when there are network changes.

BRIEF SUMMARY OF THE DISCLOSURE

The present disclosure relates to systems and methods for dynamic path computation in networks based on automatically detected unavoidable risks. In particular, the present disclosure includes an adjustment to path computation to automatically detect and address unavoidable SRLGs. Of note, as described herein, the shared risks are referred to as SRLGs, but those skilled in the art will recognize these can be any types of risks, i.e., also SRNG, SREG, and the like. By automating this in path computation, there is no need for manual configuration. Unavoidable SRLGs can be incorporated in ignore lists of varying scopes, newly discovered unavoidable SRLGs can be automatically flooded in the network, unavoidable SRLG lists can be automatically generated from an IGP Shortest Path First (SPF) tree, and the unavoidable SRLGs are automatically accounted for in a Constrained SPF (CSFP) computation. This minimizes configuration and provides dynamic capability for path compute and network events.

In an embodiment, the present disclosure includes a method having steps, an apparatus with a processor configured to implement the steps, and a non-transitory computer-readable medium with instructions that, when executed, cause one or more processors to perform the steps. The steps include receiving a plurality of shared risks associated with any of one or more network layers, network links, and network equipment; automatically creating a local ignore list for a source node and a remote ignore list for a destination node, based on the plurality of shared risks; and utilizing the plurality of shared risks in a path computation for a path between the source node and the destination node and ignoring any of the plurality of shared risks in the local ignore list and the remote ignore list. The local ignore list can include local shared risks of the plurality of shared risks that the path cannot egress the source node without traversing the local shared risks, and the remote ignore list can include remote shared risks of the plurality of shared risks that the path cannot ingress the destination node without traversing the remote shared risks.

The automatically creating the local ignore list can include steps of determining all egress interfaces at the source node through which the destination node is reachable; performing an intersection of all shared risks of the plurality of shared risks on the egress interfaces; and providing the intersection as the local ignore list. The automatically creating the remote ignore list can include steps of computing all possible paths to the destination to determine all ingress interfaces for the destination; performing an intersection of all shared risks of the plurality of shared risks on the ingress interfaces; and providing the intersection as the remote ignore list. The automatically creating the remote ignore list can include steps of determining all egress interfaces at the destination node through which the source node is reachable; performing an intersection of all shared risks of the plurality of shared risks on the egress interfaces; and providing the intersection as the remote ignore list.

The local ignore list can be a first set of the plurality of shared risks denoted as L, wherein the remote ignore list can be a second set of the plurality of shared risks denoted as R, wherein a third set of the plurality of shared risks associated with the path can be denoted as S, and wherein the steps can further include pruning a source set of the plurality of shared risks, SS, as S−L; pruning a destination set of the plurality of shared risks, SD, as S−R; and utilizing the source set and the destination set in the path computation.

The automatically creating can include a k-shortest path computation and taking an intersection of the plurality of shared risks at the source and the destination on all k shortest paths. The path computation can be one of a diverse path, Topology-Independent Loop-Free Alternate (TI-LFA) protection of links, and TI-LFA protection of a node. The network can include an optical topology and a packet topology sharing a common control plane. The automatically creating can be performed at runtime of the path computation.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a controller which can form a controller for the network element, a PCE, an SDN controller, a management system, or the like.

DETAILED DESCRIPTION OF THE DISCLOSURE

Again, the present disclosure relates to systems and methods for dynamic path computation in networks based on automatically detected unavoidable risks. In particular, the present disclosure includes an adjustment to path computation to automatically detect and address unavoidable SRLGs. Of note, as described herein, the shared risks are referred to as SRLGs, but those skilled in the art will recognize these can be any types of risks, i.e., also SRNG, SREG, and the like. By automating this in path computation, there is no need for manual configuration. Unavoidable SRLGs can be incorporated in ignore lists of varying scopes, newly discovered unavoidable SRLGs can be automatically flooded in the network, unavoidable SRLG lists can be automatically generated from an IGP Shortest Path First (SPF) tree, and the unavoidable SRLGs are automatically accounted for in a Constrained SPF (CSFP) computation. This minimizes configuration and provides dynamic capability for path compute and network events.

Example Network

Figure 1:
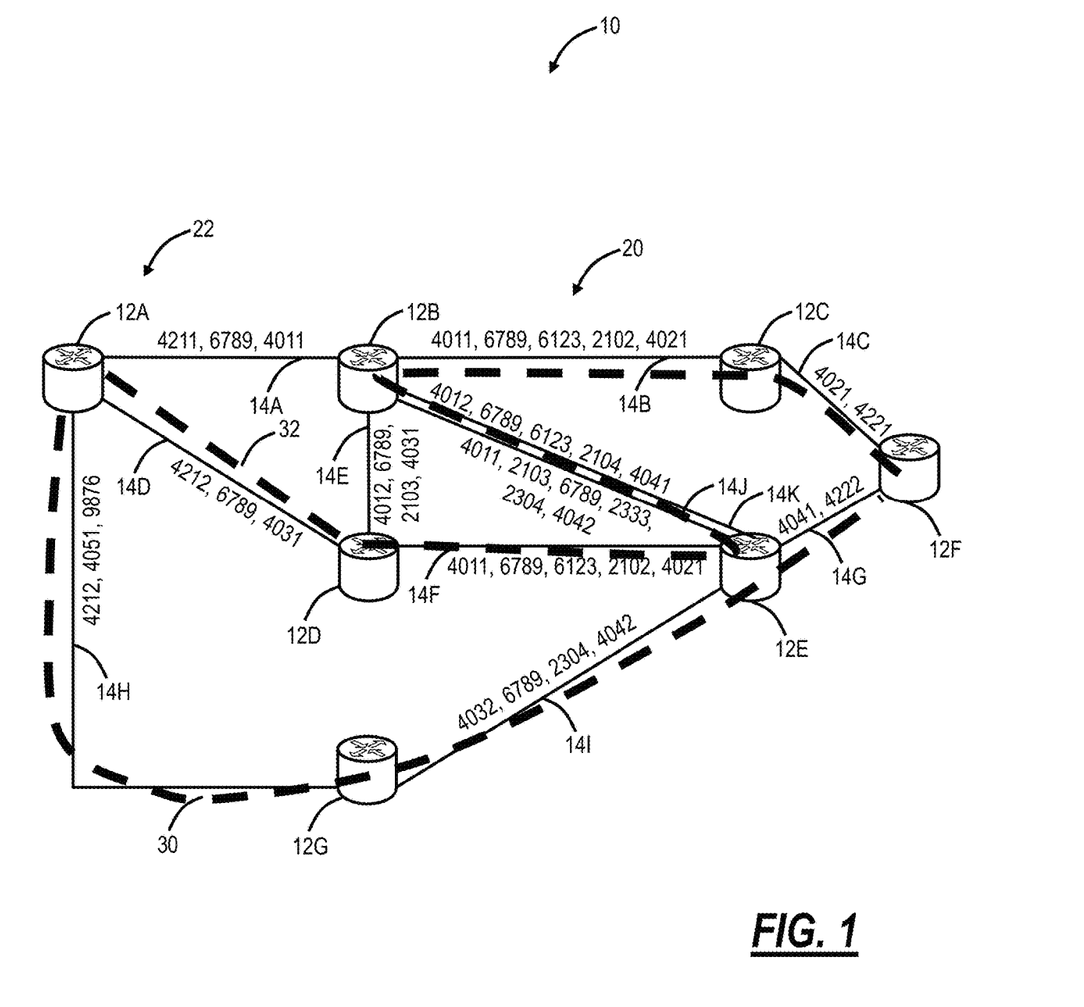
FIG. 1 is a network diagram of a network of network elements interconnected by links.

FIG. 1 is a network diagram of a network 10 of network elements 12 (labeled as network elements 12A-12G) interconnected by links 14 (labeled as links 14A-14I). The network elements 12 communicate with one another over the links 14 through Layer 0 (L0) such as optical wavelengths (Dense Wave Division Multiplexing (DWDM)), Layer 1 (L1) such as OTN, Layer 2 (L2) such as Ethernet, MPLS, etc., Layer 3 (L3) protocols, and/or combinations thereof. The network elements 12 can be network elements which include a plurality of ingress and egress ports forming the links 14. The network elements 12 can be switches, routers, cross-connects, etc. operating at one or more layers. An example network element 12 implementation is illustrated in FIG. 1. The network 10 can include various services or calls between the network elements 12. Each service can be at any of the L0, L1, L2, and/or L3 protocols, such as a wavelength, a Subnetwork Connection (SNC), an LSP, a tunnel, a connection, etc., and each service is an end-to-end path and from the view of the client signal contained therein, it is seen as a single network segment. The network 10 is illustrated, for example, as an interconnected mesh network, and those of ordinary skill in the art will recognize the network 10 can include other architectures, with additional network elements 12 or with fewer network elements 12, etc. as well as with various different interconnection topologies and architectures.

The network 10 can include a control plane operating on and/or between the network elements 12. The control plane includes software, processes, algorithms, etc. that control configurable features of the network 10, such as automating discovery of the network elements 12, capacity on the links 14, port availability on the network elements 12, connectivity between ports; dissemination of topology and bandwidth information between the network elements 12; calculation and creation of paths for calls or services; network-level protection and restoration; and the like. In an embodiment, the control plane can utilize Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) which is an optical signaling and routing protocol similar to PNNI (Private Network-to-Network Interface) and MPLS; or any other type control plane for controlling network elements at multiple layers, and establishing and maintaining connections between nodes. Those of ordinary skill in the art will recognize the network 10 and the control plane can utilize any type of control plane for controlling the network elements 12 and establishing, maintaining, and restoring calls or services between the nodes 12. In another embodiment, the network 10 can include a Software-Defined Networking (SDN) controller for centralized control. In a further embodiment, the network 10 can include hybrid control between the control plane and the SDN controller. In yet a further embodiment, the network 10 can include a Network Management System (NMS), Element Management System (EMS), Path Computation Element (PCE), etc. That is, the present disclosure contemplates any type of controller for path computation utilizing the unavoidable network risks described herein. That is, the present disclosure is not limited to a control plane, SDN, PCE, etc. based path computation technique.

Again, SRLGs are risks that are compared between two potential paths to ensure diversity between them. The risks can include, without limitation, fibers, fiber conduits, physical junctions, bridges, Reconfigurable Optical Add/Drop Multiplexer (ROADM) degree, network element 12, a module in the network element 12, or any physical construct associated with the link 14 physically. For diversity, the SRLGs between two connections are compared, and any shared risk indicates a diversity concern or single point of failure for both connections. The objective of SRLGs is to model various risks to enable comparison during route computation.

In FIG. 1, each link 14 is assigned associated SRLGs 20 for risks, and each is a unique value. Also, each node 12 is assigned associated SRNGs and/or SREGs 22, again each is a unique value representing a specified risk. Note, for illustration purposes, the SRNGs and/or SREGs 22 just show the reference numeral of the network element, e.g., 12A. Also, for illustration purposes, FIG. 1 lists each SRLG 20 as a four-digit number, but those skilled in the art will recognize these SRLGs, SRNGs, and SREGs can be a 32-bit value or the like. For example, the link 14A has SRLGs 4211, 6789, 4011 and the link 14B has SRLGs 4011, 6789, 6123, 2102, 4021. In path computation, the fact these two links 14A, 14B have the same SRLGs 6789, 4011 indicates these links 14A, 14B have a common risk and are not diverse/disjoint. The link 14H has SRLGs 4212, 4051, 9876, and when compared to the link 14A, there are no common SRLGs, and thus these two links 14A, 14H are diverse, i.e., no common risk. Depending on the network 10 implementation, the SRLGs 20 and the SRNGs and/or SREGs 22 can be flooded (in a control plane), managed (in an SDN controller, NMS, EMS, PCE, etc.), or the like.

As an example, assume there are two connections 30, 32 between the network elements 12A, 12F, e.g., the connection 30 can be a primary tunnel (LSP), and the connection 32 can be a backup tunnel (LSP). Thus, there is a requirement for the connection 30 and the connection 32 to be disjoint, i.e., that they do not share a network risk. The connection 30 has a path over links 14H, 14I, 14G. The path for the connection 32 is calculated, and then all of the network risks on the calculated path are compared to the network risks on the path for the connection 30. Assume the only viable path for the connection 32 is through the network element 12E. With conventional approaches, this path would fail as here the connection 32 would share a same network risk, namely the network element 12E, as the connection 30. However, these paths do not share a link 14. The network element 12E is a "permitted network risk." With the present disclosure, this permitted network risk is allowed, such that the connections 30, 32 can share the network element 12E, if required for the connection 32.

Example Network Element/Node

Figure 2:
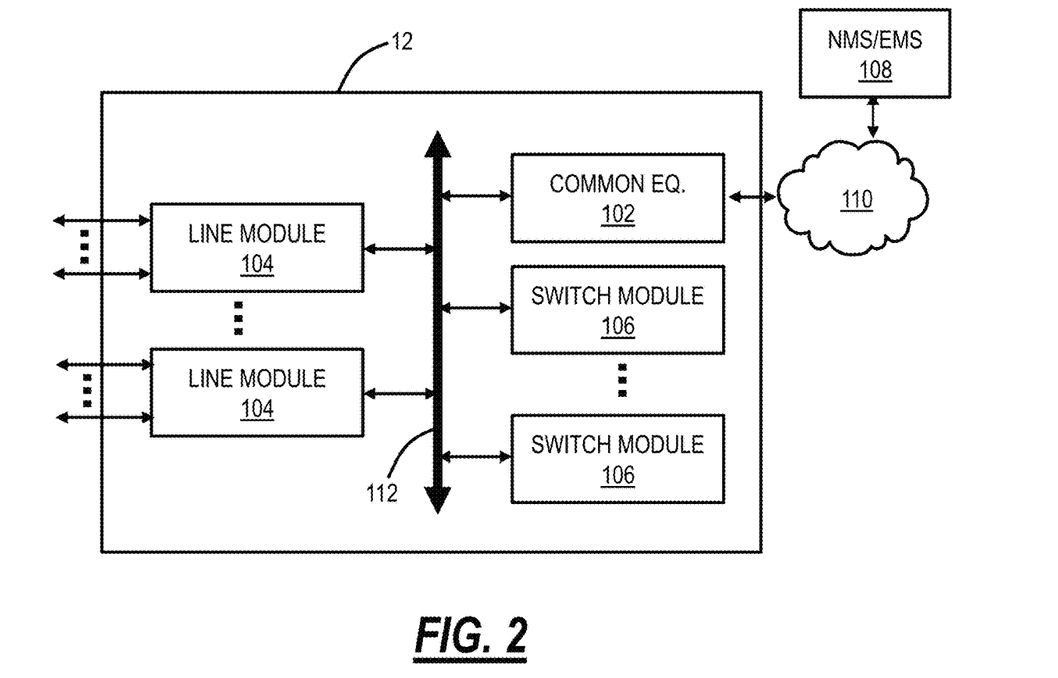
FIG. 2 is a block diagram of an example network element (node) for use with the systems and methods described herein.

FIG. 2 is a block diagram of an example network element 12 (node) for use with the systems and methods described herein. In an embodiment, the network element 12 can be a device that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation. In another embodiment, the network element 12 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, etc. That is, the network element 12 can be any digital and/or optical system with ingress and egress digital and/or optical signals and switching of channels, timeslots, tributary units, wavelengths, etc.

In an embodiment, the network element 12 includes common equipment 102, one or more line modules 104, and one or more switch modules 106. The common equipment 102 can include power; a control module; Operations, Administration, Maintenance, and Provisioning (OAM&P) access; user interface ports; and the like. The common equipment 102 can connect to a management system 108 through a data communication network 110 (as well as a PCE, an SDN controller, etc.). Additionally, the common equipment 102 can include a control plane processor, such as a controller 200 illustrated in FIG. 3 configured to operate the control plane as described herein. The network element 12 can include an interface 112 for communicatively coupling the common equipment 102, the line modules 104, and the switch modules 106 to one another. For example, the interface 112 can be a backplane, midplane, a bus, optical and/or electrical connectors, or the like. The line modules 104 are configured to provide ingress and egress to the switch modules 106 and to external connections on the links to/from the network element 12. In an embodiment, the line modules 104 can form ingress and egress switches with the switch modules 106 as center stage switches for a three-stage switch, e.g., a three-stage Clos switch. Other configurations and/or architectures are also contemplated.

Further, the line modules 104 can include a plurality of optical connections per module, and each module may include a flexible rate support for any type of connection. The line modules 104 can include WDM interfaces, short-reach interfaces, and the like, and can connect to other line modules 104 on remote network elements, end clients, edge routers, and the like, e.g., forming connections on the links in the network 10. From a logical perspective, the line modules 104 provide ingress and egress ports to the network element 12, and each line module 104 can include one or more physical ports. The switch modules 106 are configured to switch channels, timeslots, tributary units, packets, etc. between the line modules 104. For example, the switch modules 106 can provide wavelength granularity (Layer 0 switching); OTN granularity; Ethernet granularity; and the like. Specifically, the switch modules 106 can include Time Division Multiplexed (TDM) (i.e., circuit switching) and/or packet switching engines. The switch modules 106 can include redundancy as well, such as 1:1, 1:N, etc.

Those of ordinary skill in the art will recognize the network element 12 can include other components which are omitted for illustration purposes, and that the systems and methods described herein are contemplated for use with a plurality of different network elements with the network element 12 presented as an example type of network element. For example, in another embodiment, the network element 12 may not include the switch modules 106, but rather have the corresponding functionality in the line modules 104 (or some equivalent) in a distributed fashion. Also, the network element 12 may omit the switch modules 106 and that functionality, such as in a DWDM terminal. For the network element 12, other architectures providing ingress, egress, and switching are also contemplated for the systems and methods described herein. In general, the systems and methods described herein contemplate use with any network element, and the network element 12 is merely presented as an example for the systems and methods described herein.

Example Controller

Figure 3:
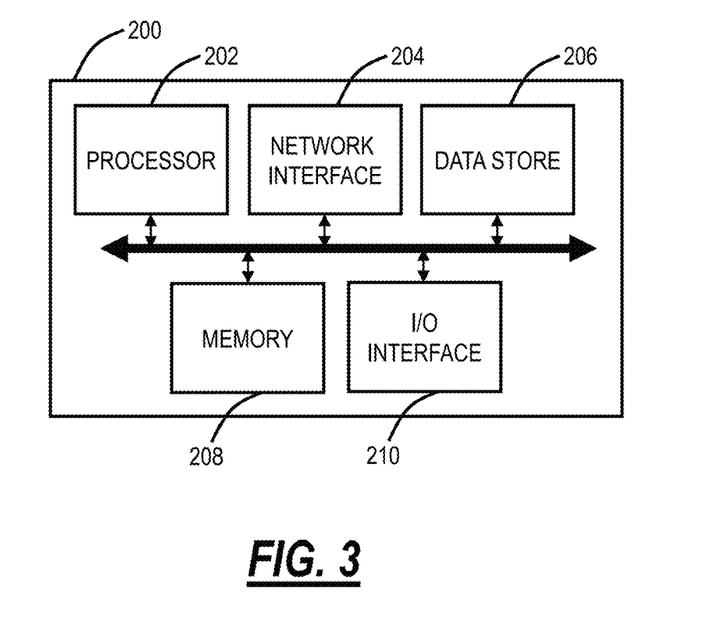

FIG. 3 is a block diagram of a controller 200 which can form a controller for the network element 12, a PCE, an SDN controller, a management system, or the like. The controller 200 can be part of the common equipment, such as common equipment 102 in the network element 100, or a stand-alone device communicatively coupled to the network element 100 via the data communication network 110. In a stand-alone configuration, the controller 200 can be the management system 108, a PCE, etc. The controller 200 can include a processor 202 which is a hardware device for executing software instructions such as operating the control plane. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 54 can be used to enable the controller 200 to communicate on a Data Communication Network (DCN), such as to communicate control plane information to other controllers, to a management system, to the network elements 12, and the like. The network interface 204 can include, for example, an Ethernet module. The network interface 204 can include address, control, and/or data connections to enable appropriate communications on the network. The data store 206 can be used to store data, such as control plane information, provisioning data, OAM&P data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices. Further, the I/O interface 210 includes components for the controller 200 to communicate with the other nodes, such as using overhead associated with OTN signals.

The controller 200 is configured to implement software, processes, algorithms, etc. that can control configurable features of the network 10, such as automating discovery of the network elements 12, capacity on the links 14, port availability on the network elements 12, connectivity between ports; dissemination of topology and bandwidth information between the network elements 12; path computation and creation for connections; network-level protection and restoration; and the like. As part of these functions, the controller 200 can include a topology database that maintains the current topology of the network 10, such as based on control plane signaling and a connection database that maintains available bandwidth on the links again based on the control plane signaling as well as management of the network risks for diverse path computation.

The present disclosure contemplates path computation via the controller 200 in a network element 12, via a PCE, NMS, EMS, SDN controller, and the like, etc.

Problem Statement

The network topology view is very different for packet and optical layers. The packet topology presents the logical view of the network where the optical topology presents the physical layout of the network.

Figure 4:
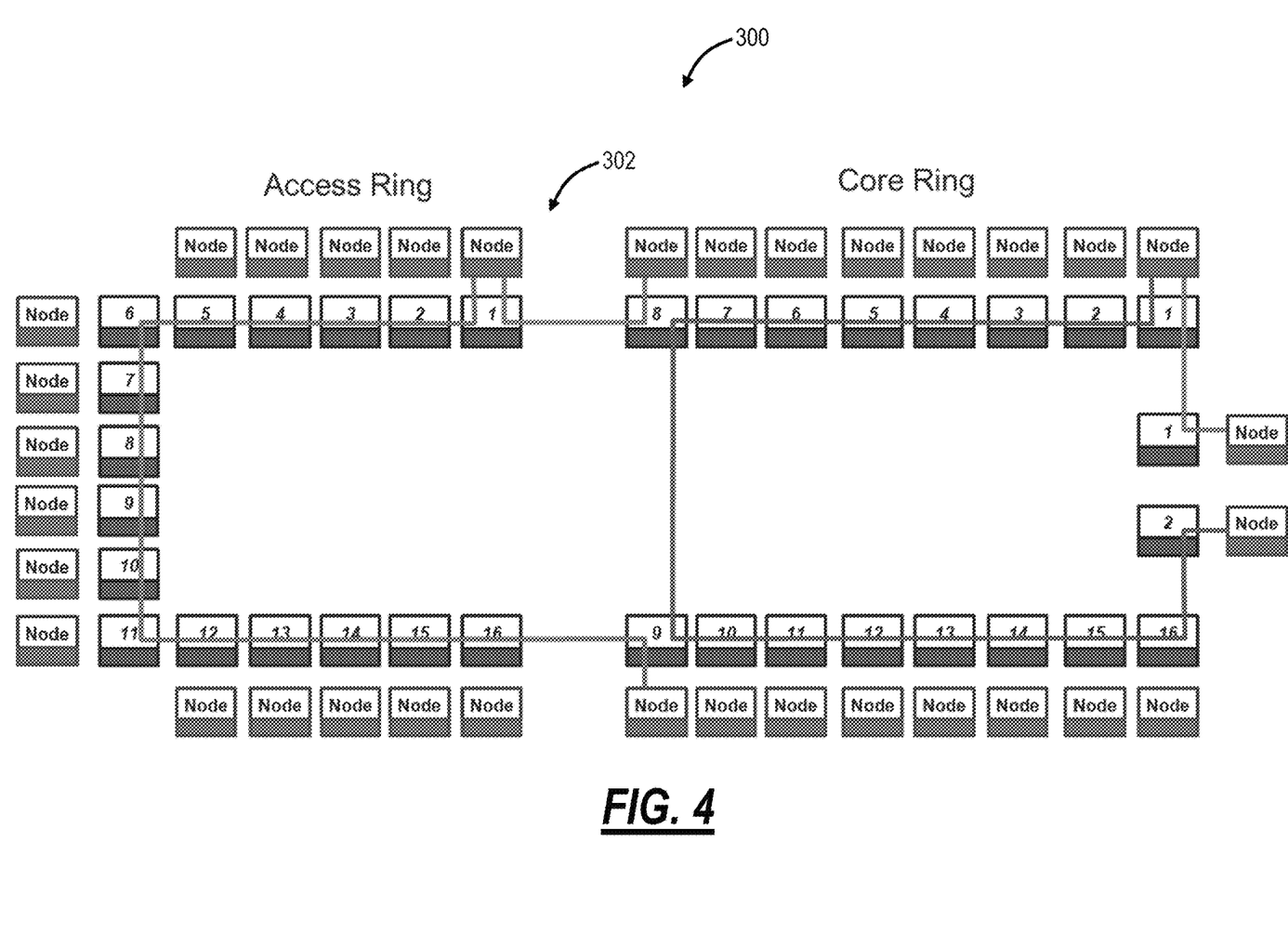
FIG. 4 is an example of a network with an optical topology.
Figure 5:
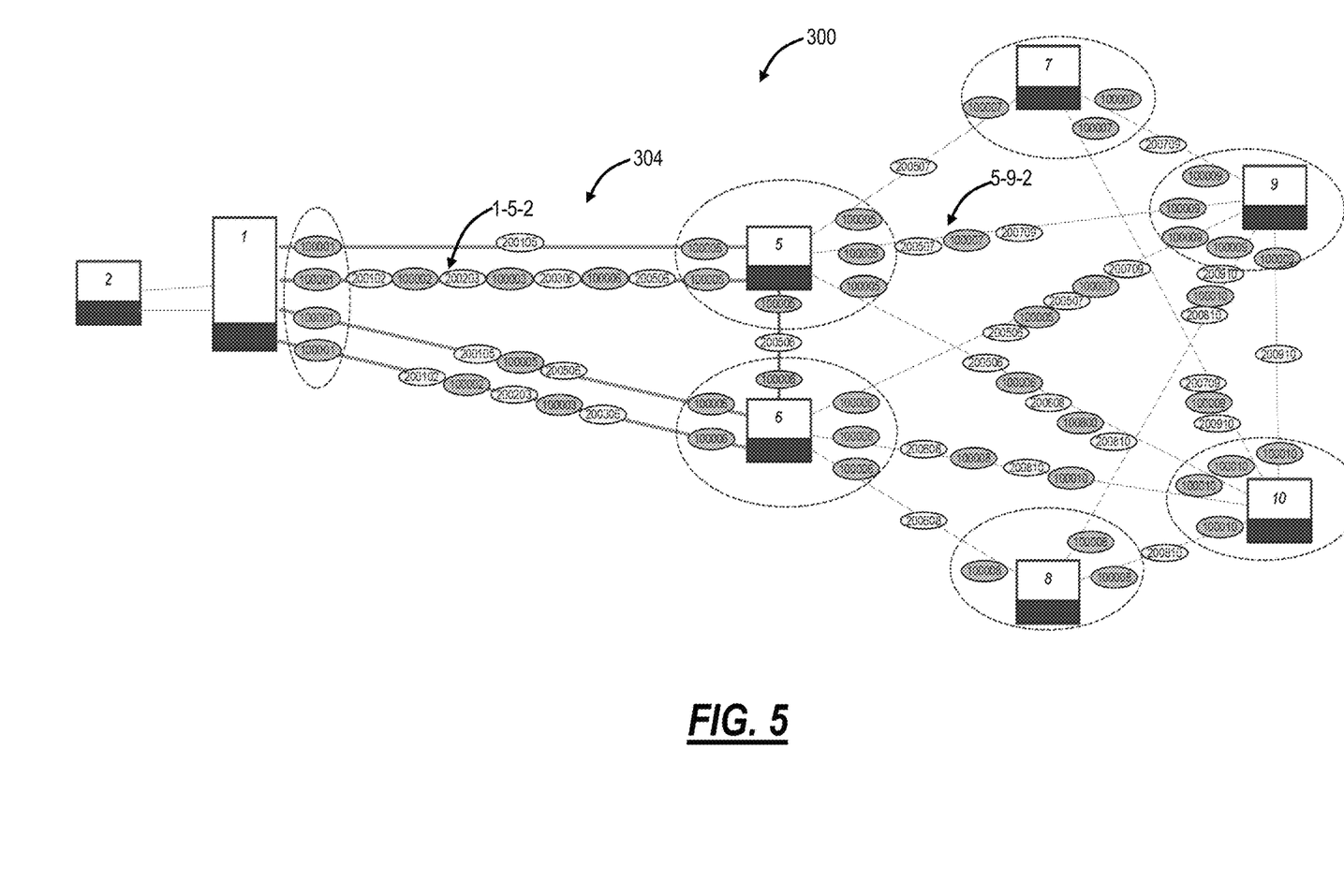
FIG. 5 is an example of the network with a packet topology.

FIG. 4 is an example of a network 300 with an optical topology 302. FIG. 5 is an example of the network 300 with a packet topology 304. The optical topology 302 can host the packet topology 304 and different logical packet links may traverse same optical topology link.

As control planes for packet and optical merge to provide a converged look at the topology. This poses a challenge for diverse path compute. In a merged control plane, all SRLGs from optical topology are leaked into packet control plane. This exposes the fact that all packet interfaces may be relying on the same ROADM node. This makes diverse path compute impossible because of common SRLGs. This is also a challenge for Topology-Independent Loop-Free Alternate (TI-LFA) protection calculation.

Figure 6:
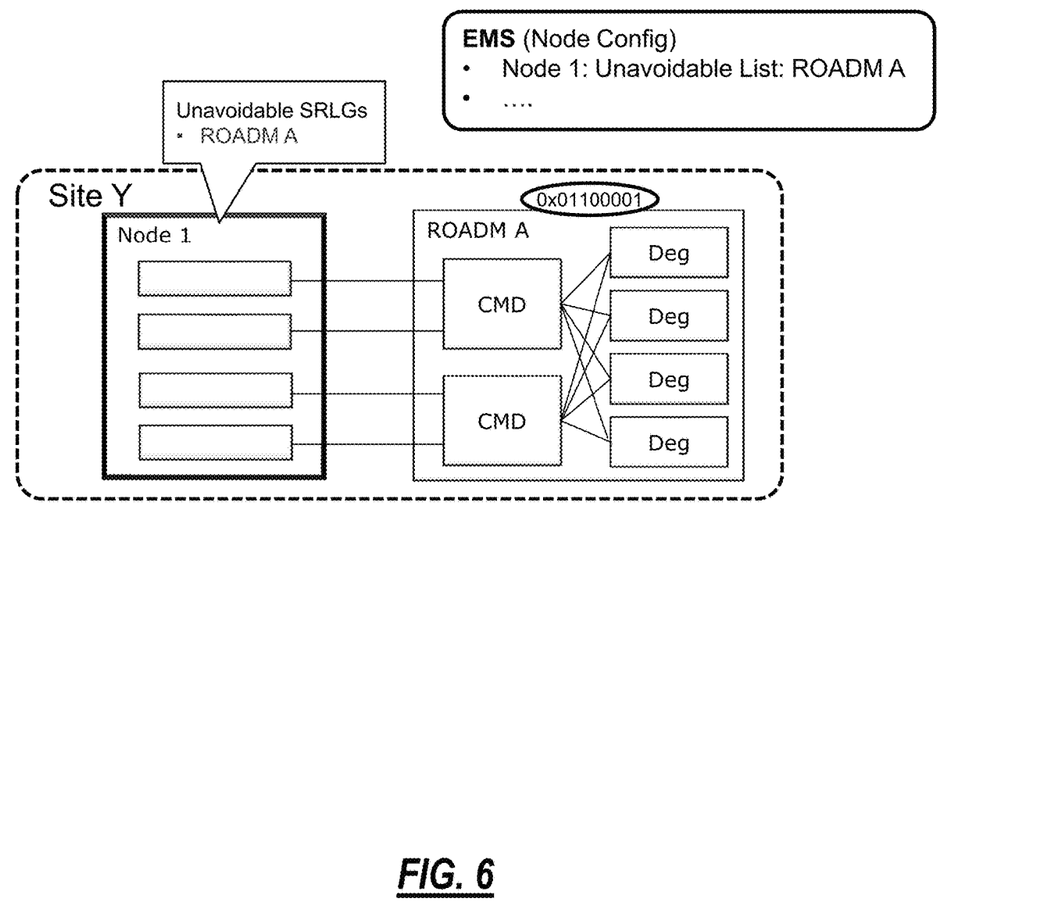
FIG. 6 is an example of a SRLG configuration.

FIG. 6 is an example of a SRLG configuration 400. As shown, all packet interfaces from site Y to go through ROADM A and site Z have to go through ROADM B. All diverse path compute out of the sites Y, Z will share the ROADM SRLG for the ROADMs A, B, respectively, and hence will not be diverse.

Referring back to FIG. 5, of note, at the network element 1, the SRLG 100001 is common to all links and thus is unavoidable. Also, the other network elements have similar unavoidable SRLGs.

Another example of unavoidable SRLG would any SRLG assigned to the site (e.g., Point of Presence (POP)) where the source and destination nodes e.g., building, chassis, node itself. If there is only one line card facing towards the destination, then the SRLG associated with that line card. All such SRLGs will qualify as unavoidable SRLGs.

Existing Solutions

A Shared SRLG concept was introduced to exclude certain SRLGs which are unavoidable for a given calculation because of topology constraints e.g., a single ROADM node through which all ports are connected. The shared SRLG concept introduced Command Line Interfaces (CLIs) to specifically call out SRLGs that are shared (or should be ignored).

For Fast Reroute (FRR), a new CLI was added, e.g.,
mpls tunnel-auto-fb-profile set auto-fb-profile if-5-8-fb-profile share-srlg-node 21,22 share-srlg-link 21,22

For Dynamic Co-Routed Tunnels (DCRT) tunnels, new CLI options were introduced as part of backup path command, e.g.,
gmpls tp-tunnel create rsvp-ingress-corout prot gmpls tp node1 dest-ip 1.1.1.1 setup-priority 2 hold-priority 2 sticky-lsp on auto-backup on path-diverse srlg-and-link strict bfd-monitor enable bfd-profile BFD-10 ms backup-resource-include-all blue share-srlg 21,22 resource-include-all red lsp-reopt enable increment-bandwidth 10000 auto-size enable auto-size-interval 30

This is a configuration intensive process. Every node must be configured with shared-srlg and every technology type has their own configuration for this information even though its use is only diverse path and/or protection compute.

For strict and loose SRLGs, this concept is very similar to Shared SRLG concept. Strict means the SRLG is mandatory to include in compute. By default, all SRLGs are mandatory. Loose means the SRLG is optional in compute and can be ignored. Every node has its configuration for SRLGs and when a diverse path compute fails, a recompute is done after ignoring the SRLGs that are marked as loose. Like the shared SRLG concept, this approach is also configuration intensive with added burden of at least one path compute failure.

Definitions

The present disclosure removes the configuration intensive approach to identifying unavoidable SRLGs and automatically detects them as part of path computation as well as flooding them in the network 10.

As described herein, an SRLG, S, is unavoidable if:
(1) a path cannot egress the headend (source) node without traversing the resource marked with S, and
(2) the path cannot ingress the tailend (destination) node without traversing the resource marked with S.

A collection of the unavoidable SRLGs may be includes in an unavoidable SRLG list on the headend and tailend and may or may not have common elements. This list of unavoidable SRLGs can be called an ignore list.

Local Ignore List—A local ignore list is collection of unavoidable SRLGs that affect a path compute as they represent a resource directly connected to or on the source node. SRLGs in this list need to be ignored on source to reach a given prefix. Following would be the local ignore list on node 1 to get to any node—Local ignore list={100001}.

Remote Ignore list—A remote ignore list is collection of unavoidable SRLGs that affect a path compute as they represent a resource directly connected to or on the destination node. This is a per prefix ignore list of SRLGs on the destination node that must be ignored on the source node during path compute. Remote ignore list={100009}.

Global ignore list—A global ignore list is collection of unavoidable SRLGs from global scope. It is a union of all local and remote ignore lists configured or learnt in the network. Global ignore list=Local ignore list∪Remote ignore list={10000, 100009}.

Knowledge of local and remote ignore list for diverse or protection path compute is a must. Following are proposed approaches of learning local and remote ignore lists.
(1) Configuration of local and remote ignore lists on every node.
(2) Configuration of local ignore list on every node and flooded to the network via IGP.
(3) Configuration of global ignore list on every node, local and remote ignore lists are derived at path compute time.
(4) Encoding unavoidable nature of SRLG in the SRLG value and flooding this mask in the network via IGP.
(5) Auto generate local and remote ignore lists before path compute.

Configuration Based Solution

A global ignore list can be provided at configuration time. This global configuration will need to be configured on every node in the administrative domain that will be headend to a path. Every newly added node will require this configuration and all the nodes will require an update to their ignore list with unavoidable SRLG from newly added node.
mpls traffic-eng set global unavoidable-srlg 100001, 100002, 100003, 100006, 100005

Configuring a Mask to Identify Unavoidable SRLG

Alternatively, all unavoidable SRLGs can be configured with a specific bit set and all the nodes in the administrative domain can be configured with a bitmask that enables them to test if it is unavoidable SRLG or not. Every new node will need to be configured with this mask. Existing nodes in the network will not require an update to their configuration. As an extension to IGP (Interior Gateway Protocol), e.g., ISIS, this information can be flooded with a new sub-TLV type, to extended reachability TLV type, specifically defined to carry SRLG bitmasks. This will require automatically flooding the bitmask for unavoidable SRLG.

Figure 7:
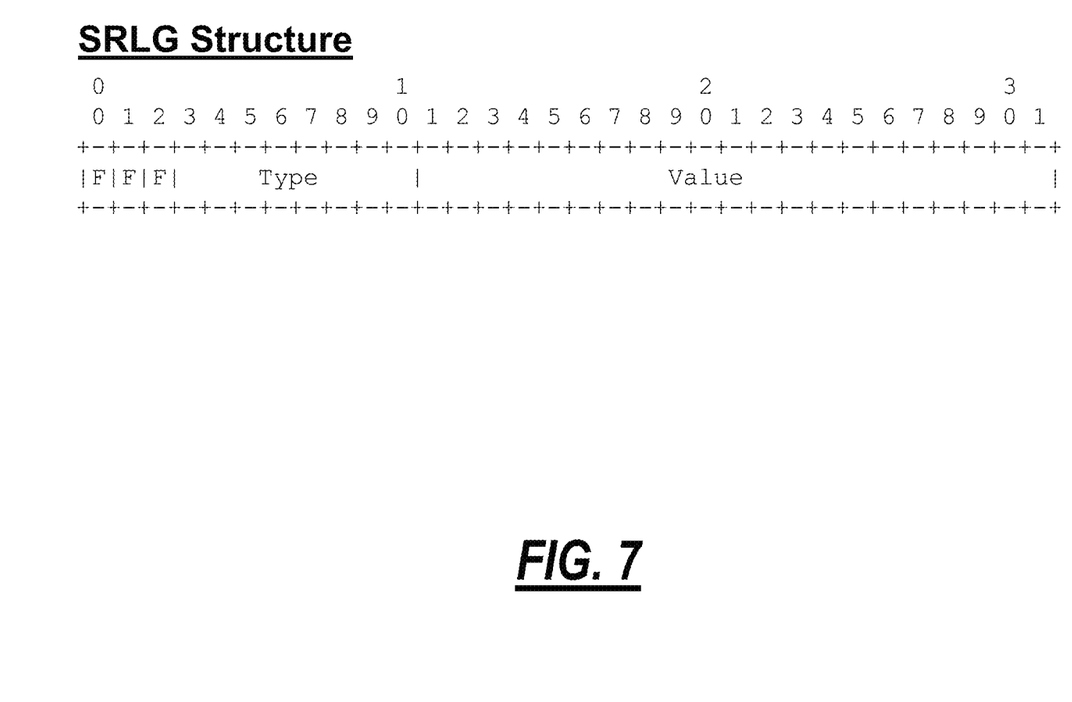
FIG. 7 is an example bitmask for flooding SRLG information.

Consider the following bitmask in FIG. 7. Bit position 1 can be reserved for unavoidable SRLG. An IGP CLI can be introduced to configure this bitmask which can then be flooded in the network. Using this bitmask, nodes can build their global ignore list by first testing every configured and learnt SRLG against the bitmask and adding it to ignore set.

Note, all approaches mentioned above require some form of configuration. Either an explicit configuration or bitmask to determine the SRLG type.

Automatic Building of Ignore List

An unavoidable SRLG must be ignored because on the source and destination of a path they cover all paths and without ignoring them no path can be calculated. If we take intersection of all locally configured SRLGs on all interfaces we get a set L, this set will give us unavoidable SRLGs for this local node. Similarly, we can compute the destination's unavoidable SRLG set by isolating only the SRLGs advertised by the destination on link-by-link basis and then getting their intersection. If there are more than one ROADM node in the middle of the path, only interface through which there is reachability to the destination should be considered. This step can become part of path compute to make sure compute can keep up with the network changes.

Local Unavoidable SRLG (Local Ignore List)

Following steps can be used to compute the local ignore list for a path calculation to destination prefix D.
(1) Find all interface through which prefix D is reachable.
(2) Take the intersection of all SRLGs configured on those interfaces.
(3) Resulting set will be local ignore list for that prefix.

Remote Unavoidable SRLG (Remote Ignore List)

Remote list calculation can be done in multiple ways.
(1) Source can compute all possible paths to the destination to find all the ingress interfaces for destination. Intersection of SRLGs from this interface list will give us remote ignore list.

(2) Compute local ignore list from destination's perspective with source node as the destination. This will be faster but may not be accurate as reachability may not be symmetric.

Path Computation with Automatic Identification of Unavoidable SRLGs

The ignore lists can be automatically created before path computation as well as determined during path computation. Of note, the unavoidable SRLG ignore lists (local and remote) are automatically determined in the present disclosure, removing the need for complex manual configuration. Referring to FIG. 5, assume we want to compute a path from node 1 to node 9. Let us consider the following configuration which would be applied on node 1 in the above shown topology. This shows standard configuration for SRLG configured:

mpls traffic-eng set ip-interface if-1-5-1 srlg 100001, 200105, 100005 mpls traffic-eng set ip-interface if-1-5-2 srlg 100001, 200102, 100002, 200203, 100003, 200306, 100006, 100005 mpls traffic-eng set ip-interface if-1-6-1 srlg 100001, 200105, 100005, 200506, 100006 mpls traffic-eng set ip-interface if-1-6-2 srlg 100001, 200102, 100002, 100003, 200306, 100006

First step to path computation is to build local and remote ignore lists. Alternatively, it is possible to build local and remote ignore lists at path computation runtime, namely in a k-shortest path computation, if all k paths at the source and destination have the same SRLGs, these can be automatically added to or to create the local and remote ignore lists.

Assume in the path computation, a path is computed from the source node 1 to the destination node 9 via intermediate node 5. There are three protection scenarios.
(1) A path diverse of the path from nodes 1-5-9.
(2) TI-LFA path for the protection of links between node 1 and node 5.
(3) TI-LFA path for node protection for node 5.

(1) A Path Diverse of the Path from Nodes 1-5-9.

Before or while running Dijkstra's algorithm for SPF calculation, the local ignore list must be calculated. Of note, Dijkstra's algorithm is a common SPF calculation, and those skilled in the art will appreciate the present disclosure contemplates any path computation algorithm and is not limited Dijkstra's algorithm.

Based on process described above, local ignore list for source 1 and destination 9 is L. Based on process described above remote ignore list for source 1 and destination 9 is R. L and R are sets of SRLGs that can be ignored. For the existing path, from node 1 to 5 link 1-5-2 is used. SRLG list for this link is equal to S1={100001, 200102, 100002, 200203, 100003, 200306, 100006, 100005}. From node 5 to node 9 link 5-9-2 is used. SRLG list for this link is S2={100005, 200507, 100007, 200709, 100009}.

SRLG list to be considered for path calculation will be a S={union of S1 and S2}.

Before or while running Dijkstra's algorithm, links/nodes that should not be considered require pruning. A link not associated with either source or destination, SRLG set S will be used for pruning.

For pruning links associated with source set SS will be used, where, SS=S−L.

For pruning links associated with destination, set SD will be used, where, SD=S−R.

Once the tree is pruned, Dijkstra's algorithm can be used on it. Also, this pruning can be done at runtime.

TI-LFA Path for the Protection of Links Between Node 1 and Node 5

Preparation for computing TI-LFA path is same as described above for the diverse path. Once the pruned tree is ready then TI-LFA calculation can be run it.

TI-LFA Path for Node Protection for Node 5

For node protection, node 5 is pruned out of the tree. Using the prefix being protected as destination, alternate path calculation process as described above can be used to calculate TI-LFA post convergence path.

Figure 8:
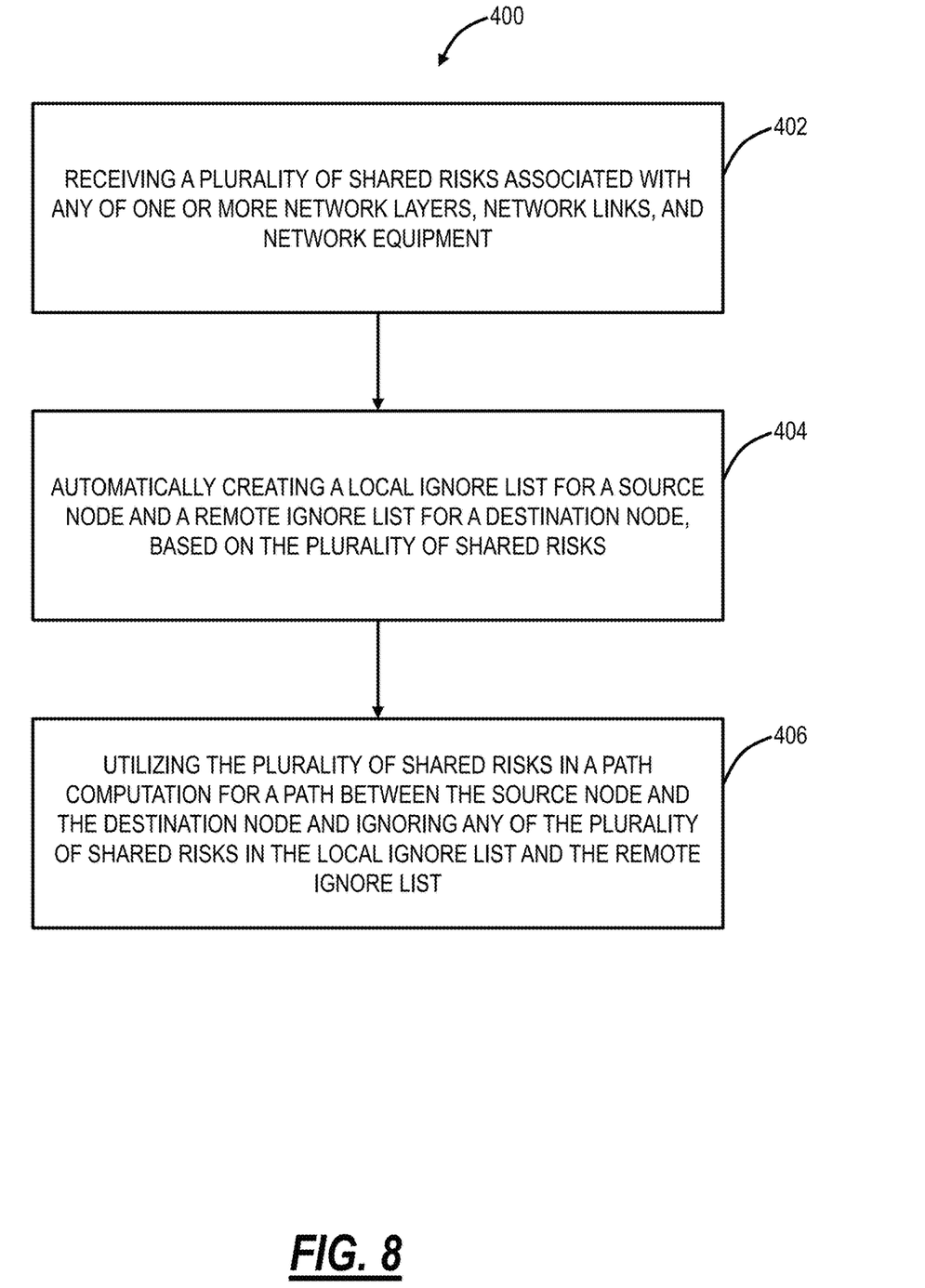
FIG. 8 is a flowchart of a process for dynamic path computation in networks based on automatically detected unavoidable risks.

Process for Dynamic Path Computation in Networks Based on Automatically Detected Unavoidable Risks FIG. 8 is a flowchart of a process 400 for dynamic path computation in networks based on automatically detected unavoidable risks. The process 400 contemplates implementation as a method, execution via a processing device such as the controller 200, the network element 12, a management system, a PCE, an SDN controller, etc., and as instructions stored in a non-transitory computer-readable medium that, when executed, cause one or more processors to perform the process 400.

The process 400 includes receiving a plurality of shared risks associated with any of one or more network layers, network links, and network equipment (step 402); automatically creating a local ignore list for a source node and a remote ignore list for a destination node, based on the plurality of shared risks (step 404); and utilizing the plurality of shared risks in a path computation for a path between the source node and the destination node and ignoring any of the plurality of shared risks in the local ignore list and the remote ignore list (step 406).

The local ignore list can include local shared risks of the plurality of shared risks that the path cannot egress the source node without traversing the local shared risks, and the remote ignore list can include remote shared risks of the plurality of shared risks that the path cannot ingress the destination node without traversing the remote shared risks.

The automatically creating the local ignore list can include steps of determining all egress interfaces at the source node through which the destination node is reachable; performing an intersection of all shared risks of the plurality of shared risks on the egress interfaces; and providing the intersection as the local ignore list.

The automatically creating the remote ignore list can include steps of computing all possible paths to the destination to determine all ingress interfaces for the destination; performing an intersection of all shared risks of the plurality of shared risks on the ingress interfaces; and providing the intersection as the remote ignore list. The automatically creating the remote ignore list can also include steps of determining all egress interfaces at the destination node through which the source node is reachable; performing an intersection of all shared risks of the plurality of shared risks on the egress interfaces; and providing the intersection as the remote ignore list. Note, this approach assumes symmetric connectivity between the source and destination.

The local ignore list is a first set of the plurality of shared risks denoted as L, the remote ignore list is a second set of the plurality of shared risks denoted as R, a third set of the plurality of shared risks associated with the path is denoted as S, and the process 400 can further include pruning a source set of the plurality of shared risks, SS, as S−L; pruning a destination set of the plurality of shared risks, SD, as S−R; and utilizing the source set and the destination set in the path computation.

The automatically creating can include a k-shortest path computation and taking an intersection of the plurality of shared risks at the source and the destination on all k shortest paths. The path computation can be one of a diverse path, Topology-Independent Loop-Free Alternate (TI-LFA) protection of links, and TI-LFA protection of a node. The network can include an optical topology and a packet topology sharing a common control plane. The automatically creating can be performed at runtime of the path computation.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause one or more processors to perform steps of:
   receiving a plurality of shared risks associated with any of one or more network layers, network links, and network equipment;
   automatically creating a local ignore list for a source node and a remote ignore list for a destination node, based on the plurality of shared risks, wherein the automatically creating includes a k-shortest path computation and taking an intersection of the plurality of shared risks at the source and the destination on all k shortest paths; and
   utilizing the plurality of shared risks in a path computation for a path between the source node and the destination node and ignoring any of the plurality of shared risks in the local ignore list and the remote ignore list.

2. The non-transitory computer-readable medium of claim 1, wherein
   the local ignore list includes local shared risks of the plurality of shared risks that the path cannot egress the source node without traversing the local shared risks, and
   the remote ignore list includes remote shared risks of the plurality of shared risks that the path cannot ingress the destination node without traversing the remote shared risks.

3. The non-transitory computer-readable medium of claim 1, wherein the automatically creating the local ignore list includes steps of
   determining all egress interfaces at the source node through which the destination node is reachable;
   performing an intersection of all shared risks of the plurality of shared risks on the egress interfaces; and
   providing the intersection as the local ignore list.

4. The non-transitory computer-readable medium of claim 1, wherein the automatically creating the remote ignore list includes steps of
   computing all possible paths to the destination to determine all ingress interfaces for the destination;
   performing an intersection of all shared risks of the plurality of shared risks on the ingress interfaces; and
   providing the intersection as the remote ignore list.

5. The non-transitory computer-readable medium of claim 1, wherein the automatically creating the remote ignore list includes steps of
   determining all egress interfaces at the destination node through which the source node is reachable;
   performing an intersection of all shared risks of the plurality of shared risks on the egress interfaces; and
   providing the intersection as the remote ignore list.

6. The non-transitory computer-readable medium of claim 1, wherein the local ignore list is a first set of the plurality of shared risks denoted as L, wherein the remote ignore list is a second set of the plurality of shared risks denoted as R, wherein a third set of the plurality of shared risks associated with the path is denoted as S, and wherein the steps further include
   pruning a source set of the plurality of shared risks, SS, as S-L;
   pruning a destination set of the plurality of shared risks, SD, as S—R; and utilizing the source set and the destination set in the path computation.

7. The non-transitory computer-readable medium of claim 1, wherein the path computation is one of a diverse path, Topology-Independent Loop-Free Alternate (TI-LFA) protection of links, and TI-LFA protection of a node.

8. The non-transitory computer-readable medium of claim 1, wherein the network includes an optical topology and a packet topology sharing a common control plane.

9. The non-transitory computer-readable medium of claim 1, wherein the automatically creating is performed at runtime of the path computation.

10. A non-transitory computer-readable medium comprising instructions that, when executed, cause one or more processors to perform steps of:
receiving a plurality of shared risks associated with any of one or more network layers, network links, and network equipment;
automatically creating a local ignore list for a source node and a remote ignore list for a destination node, based on the plurality of shared risks; and
utilizing the plurality of shared risks in a path computation for a path between the source node and the destination node and ignoring any of the plurality of shared risks in the local ignore list and the remote ignore list,
wherein the local ignore list is a first set of the plurality of shared risks denoted as L, wherein the remote ignore list is a second set of the plurality of shared risks denoted as R, wherein a third set of the plurality of shared risks associated with the path is denoted as S, and wherein the steps further include
pruning a source set of the plurality of shared risks, SS, as S-L;
pruning a destination set of the plurality of shared risks, SD, as S—R; and
utilizing the source set and the destination set in the path computation.

11. The non-transitory computer-readable medium of claim 10, wherein
the local ignore list includes local shared risks of the plurality of shared risks that the path cannot egress the source node without traversing the local shared risks, and
the remote ignore list includes remote shared risks of the plurality of shared risks that the path cannot ingress the destination node without traversing the remote shared risks.

12. The non-transitory computer-readable medium of claim 10, wherein the automatically creating the remote ignore list includes steps of
determining all egress interfaces at the destination node through which the source node is reachable;
performing an intersection of all shared risks of the plurality of shared risks on the egress interfaces; and
providing the intersection as the remote ignore list.

13. The non-transitory computer-readable medium of claim 10, wherein the path computation is one of a diverse path, Topology-Independent Loop-Free Alternate (TI-LFA) protection of links, and TI-LFA protection of a node.

14. The non-transitory computer-readable medium of claim 10, wherein the automatically creating is performed at runtime of the path computation.

15. A non-transitory computer-readable medium comprising instructions that, when executed, cause one or more processors to perform steps of:
receiving a plurality of shared risks associated with any of one or more network layers, network links, and network equipment;
automatically creating a local ignore list for a source node and a remote ignore list for a destination node, based on the plurality of shared risks; and
utilizing the plurality of shared risks in a path computation for a path between the source node and the destination node and ignoring any of the plurality of shared risks in the local ignore list and the remote ignore list,
wherein the automatically creating the remote ignore list includes steps of
computing all possible paths to the destination to determine all ingress interfaces for the destination;
performing an intersection of all shared risks of the plurality of shared risks on the ingress interfaces; and
providing the intersection as the remote ignore list.

16. The non-transitory computer-readable medium of claim 15, wherein
the local ignore list includes local shared risks of the plurality of shared risks that the path cannot egress the source node without traversing the local shared risks, and
the remote ignore list includes remote shared risks of the plurality of shared risks that the path cannot ingress the destination node without traversing the remote shared risks.

17. The non-transitory computer-readable medium of claim 15, wherein the path computation is one of a diverse path, Topology-Independent Loop-Free Alternate (TI-LFA) protection of links, and TI-LFA protection of a node.

18. The non-transitory computer-readable medium of claim 15, wherein the network includes an optical topology and a packet topology sharing a common control plane.

19. The non-transitory computer-readable medium of claim 15, wherein the automatically creating is performed at runtime of the path computation.

* * * * *